June 7, 1927.   F. G. FOLBERTH ET AL   1,631,629
WINDSHIELD CLEANER
Filed March 21, 1923   3 Sheets-Sheet 2
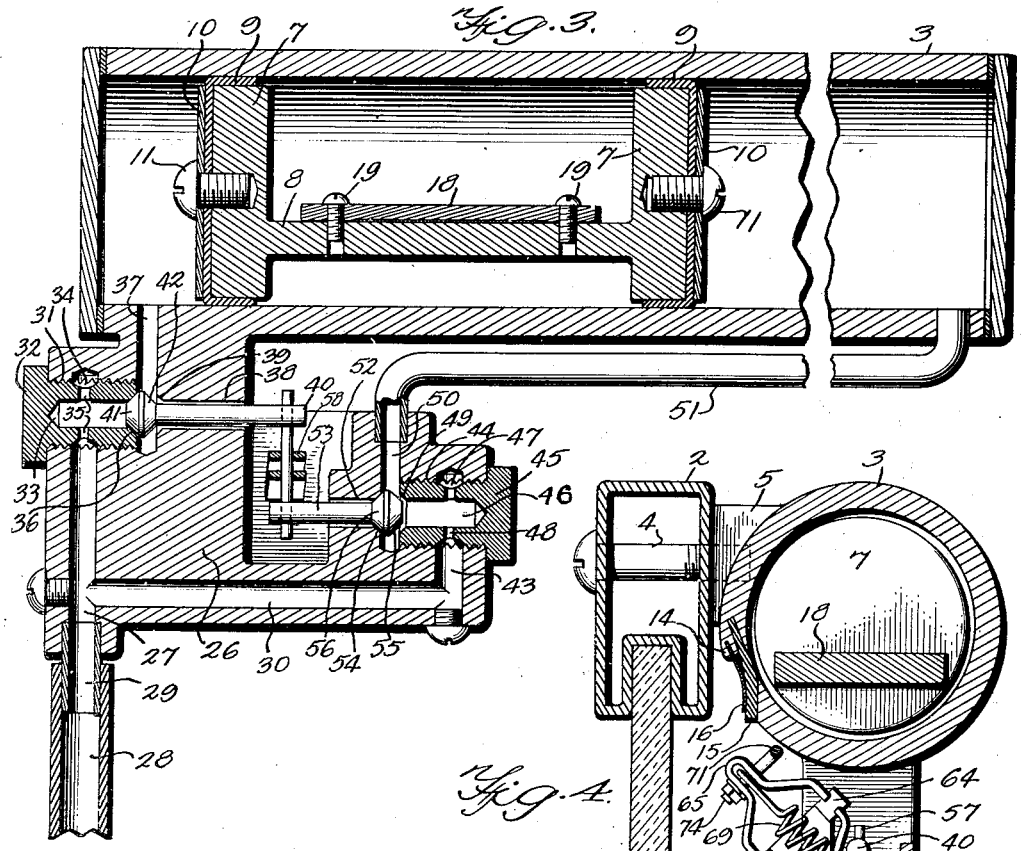
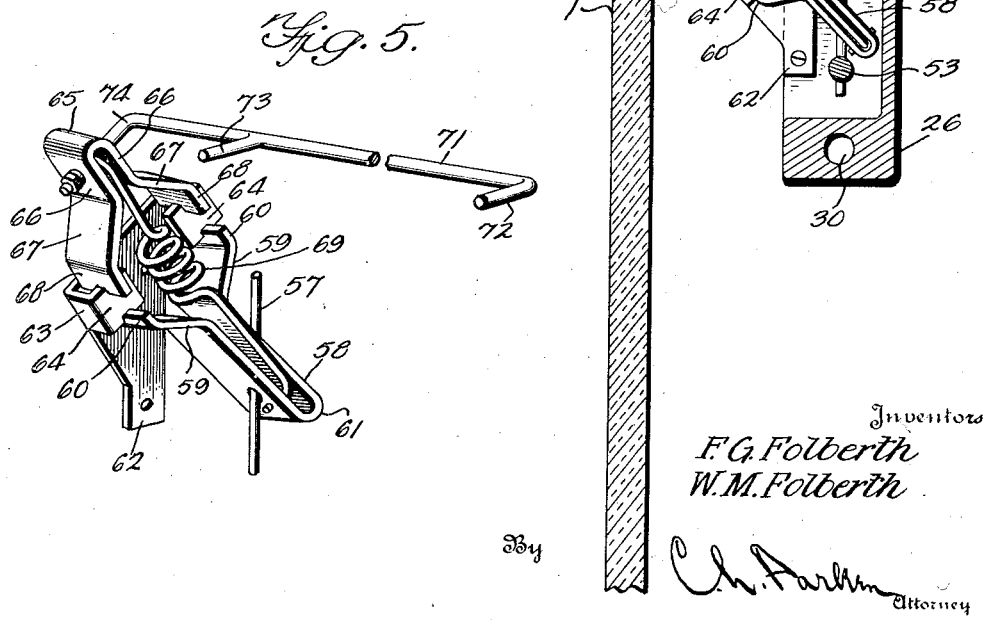
Inventors
F.G.Folberth
W.M.Folberth
By
Attorney

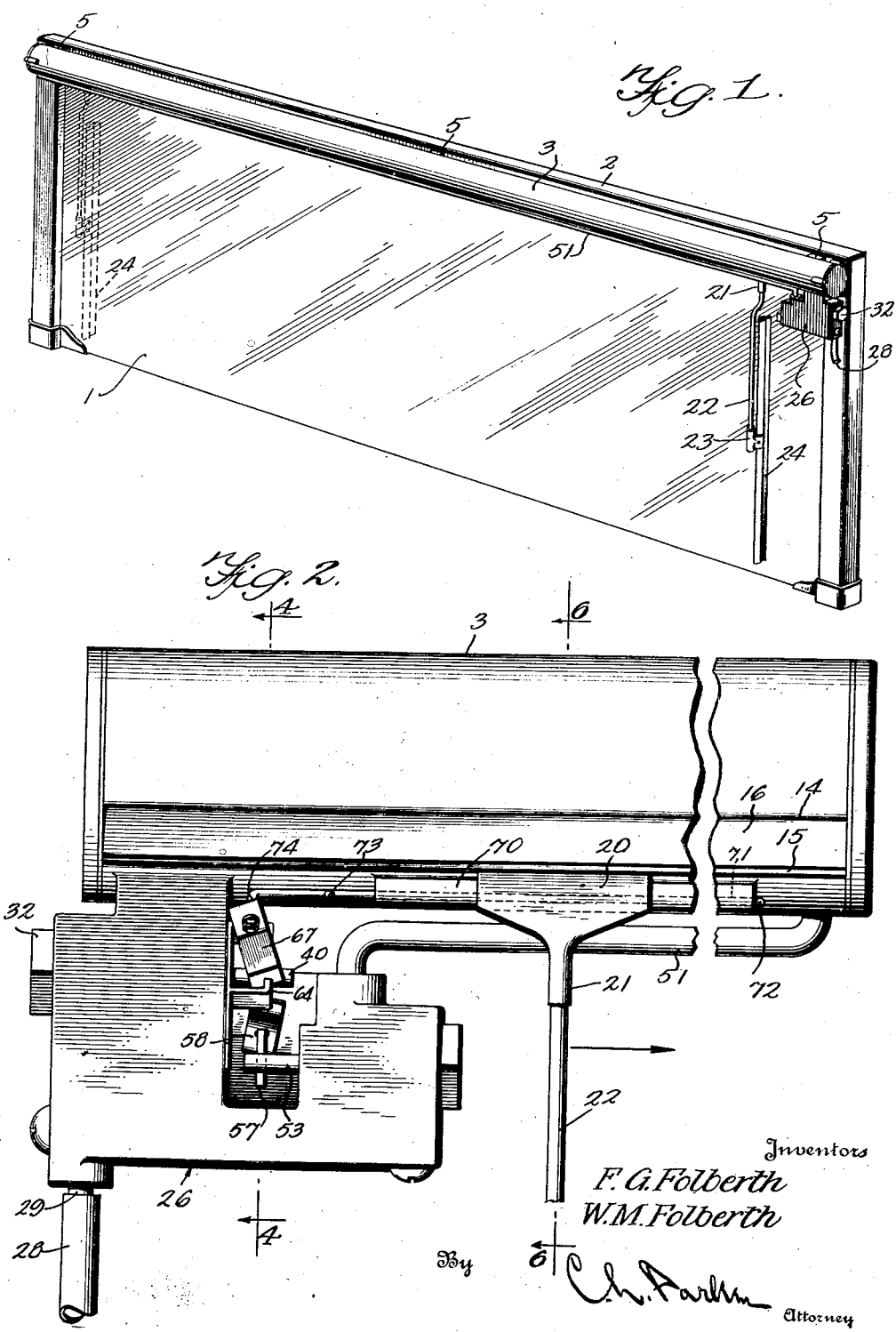

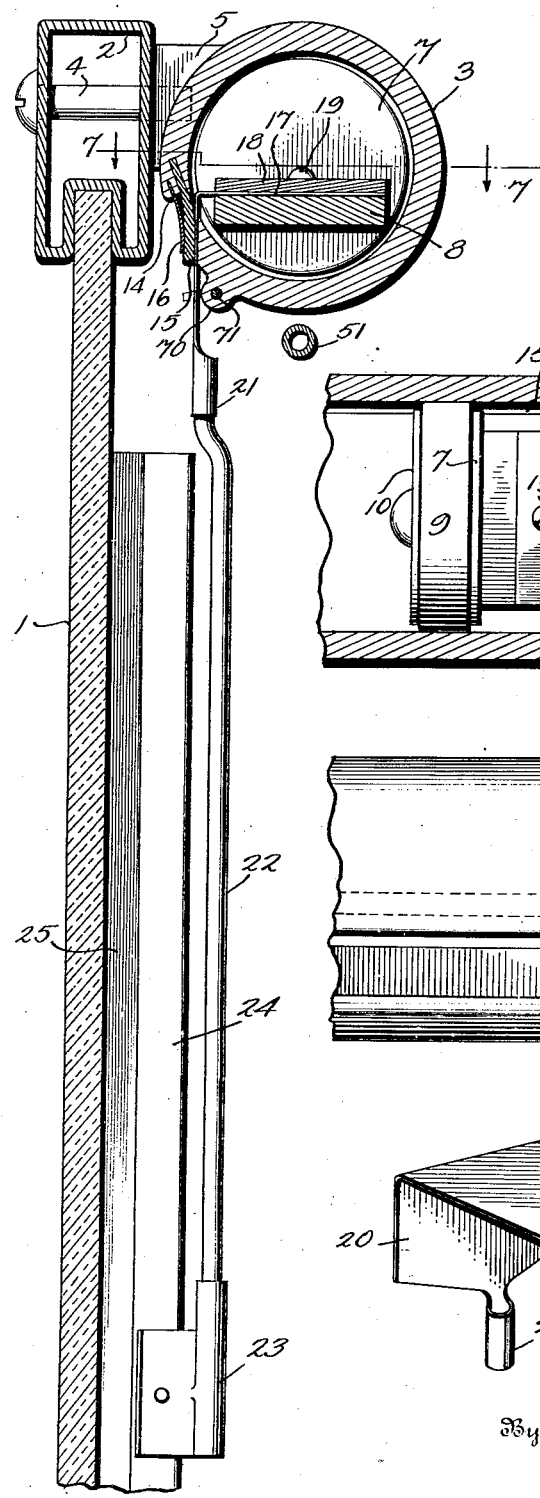

Patented June 7, 1927.

1,631,629

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK.

WINDSHIELD CLEANER.

Application filed March 21, 1923. Serial No. 626,654.

This invention relates to windshield cleaners, and more particularly to power actuated cleaners operated by differential fluid pressure.

An object of the invention is to provide a cleaner having a motor cylinder and a movable element reciprocating in the cylinder in which the cleaner arm is directly connected to the movable member.

A further object of the invention is to provide a cleaner arm extending through a slot in the cylinder, and sealing means for closing said slot, said means being movable to permit actuation of the arm.

A further object is to provide improved means for actuating a snap-over valve mechanism by the movement of the movable member.

In the accompanying drawings, we have shown one embodiment of the invention. In this showing:

Figure 1 is a perspective view of the windshield of a motor vehicle showing the invention applied, Figure 2 is a rear elevation of the cleaner removed from the windshield, Figure 3 is a central vertical longitudinal sectional view, Figure 4 is a transverse sectional view on line 4—4 of Figure 2, Figure 5 is a detail view of the valve actuating mechanism, Figure 6 is a transverse sectional view on line 6—6 of Figure 2, Figure 7 is a horizontal sectional view on line 7—7 of Figure 6, Figure 8 is a rear elevation of a portion of the cylinder showing the slot closing means removed, and, Figure 9 is a perspective view of a connecting member by means of which the cleaner arm is secured to the movable member.

Referring to the drawings, the reference numeral 1 designates the windshield of a motor vehicle, which is formed of glass or other transparent material and is mounted in a suitable frame 2. The cleaner comprises a cylindrical member 3. arranged on the exterior of the windshield and secured to the frame by means of bolts 4. As shown, these bolts pass through the frame and are received in threaded openings in enlargements 5 formed on the cylinder. A movable member 6 is mounted in the cylinder and is adapted to reciprocate therein. As shown, this movable member consists of a pair of spaced pistons 7, connected by a web 8. The pistons may be provided with suitable packing 9, retained in position by plates 10. A set screw 11 passes through each of the plates 10 and is received in the piston.

The cylinder is provided with a slot 12 in which the member connecting the piston to the wiper moves, said slot being so formed or arranged that in certain positions, or during a certain range of travel of the piston, atmospheric air would be admitted through the slot to the interior portion of the cylinder from which air is being withdrawn. In order to prevent this, means are provided for sealing the slot, which means in the present disclosure is carried by the cylinder and is designed for sealing or closing the slot, or that portion of the slot communicating with the position of the cylinder that is under the suction or air withdrawing influence.

In the particular embodiment shown, the slot is formed by cutting an opening through the cylinder substantially tangentially of the inner wall, forming a relatively broad, flat face 13 (see Figure 8). Above the slot, there is provided a face 14, substantially at right angles to the face 13. The face 14 is provided with an opening for the reception of the edge of a flexible element or flap valve 15, which is adapted to normally close the slot 12. A spring 16 is also secured in the cylinder wall and this spring bears against the flexible element 15 to retain it in position.

A connecting plate 17 is secured to the web of the pistons in any suitable manner. As shown, this plate is arranged on top of the web and is clamped thereto by a plate 18, retained in position by suitable screws 19. The plate extends beyond one side of the web, as shown in Figure 7 of the drawings, and is then continued downwardly at right angles, forming a depending portion 20, extending through the slot 12 and bearing against the face 13. The lower end of this depending portion is provided with a sleeve 21, adapted to receive a cleaner arm 22. This cleaner arm is best formed of a slightly resilient material to permit adjustment toward and away from the windshield. The lower end of the cleaner arm is provided with a cleaner element holder 23. A cleaner element is mounted in this holder.

As shown, the cleaner element consists of a rigid backing strip 24, having a sheet of rubber 25 or similar material projecting therefrom and adapted to engage the windshield.

Suitable means are provided for actuating the pistons to operate the cleaner element. The cylinder is provided with a valve casing 26, adjacent one end and this casing is provided with a port 27, connected to a pipe 28 by a suitable coupling 29. The pipe 28 is connected to the intake manifold (not shown) of the engine or to any other suitable source of differential pressure. A suitable valve (not shown) may be provided, whereby the connection between the source of pressure and the valve casing may be cut off at will. The port 27 communicates with a longitudinal passage 30. Adjacent the end of the port 27, there is provided a threaded bore 31, arranged at right angles thereto. This bore is adapted to receive a plug 32 having a central opening 33 formed therein. The exterior of the plug is provided with a circumferential groove 34, having transverse openings 35 communicating with a central opening 33. A valve seat 36 is formed on the inner end of the plug. The inner end of the bore 31 communicates with a passage 37, leading to one end of the cylinder. The passage 37 also communicates with a longitudinal passage 38 communicating with the atmosphere. This passage is provided with a valve seat 39 on its inner end. A valve stem 40, smaller in diameter than the passage 38, extends through this passage and is provided with opposed valves 41 and 42, adapted to engage the valve seats 36 and 39, respectively.

The source of pressure communicates with the opposite end of the cylinder through port 30. As shown, the end of this port communicates with a transverse port 43, having a threaded bore 44 formed therein. A plug 45 is arranged in this bore and this plug is provided with a central opening 46. The exterior of the plug is provided with a circumferential groove 47 communicating with the central opening through passages 48. The inner end of the central opening is provided with a valve seat 49. The bore 44 communicates with a passage 50, which in turn communicates with a conduit 51, leading to the other end of the cylinder. The passage 50 also communicates with a passage 52 leading to the atmosphere. A valve stem 53 smaller in diameter than the passage 52 is arranged in this passage. The inner end of the passage is provided with a valve seat 54. The valve stem is provided with oppposed valves 55 and 56, adapted to engage the seats 49 and 54 respectively.

Suitable means are provided to automatically shift the valves to alternately place the opposite ends of the cylinder in communication with the source of differential pressure. As shown, the valve stems 40 and 53 are connected to an arm 57. This arm passes through a yoke 58. The yoke consists of a pair of substantially parallel arms 70 having diverging portions 59 adjacent their ends and parallel extremities 60, arranged beyond the diverging portions. The opposite ends of the arms are connected by a loop 61. This yoke is pivotally mounted on a supporting member 62. The supporting member is secured to the valve casing in any suitable manner (see Figures 2 and 4). It is provided with a pair of upwardly extending arms 63, having their ends 64 arranged substantially parallel to the body portion. These ends are provided with notches on one side, adapted to receive the parallel extremities 60 of the yoke. The extremities of the yoke are likewise provided with notches forming an interlocking fit.

A somewhat similar yoke is arranged on the opposite side of the arms 63. As shown, the yoke comprises a loop 65 having parallel arms 66 extending therefrom. These arms are provided with diverging portions 67 and substantially parallel terminals 68. The terminals 68 are likewise provided with notches adapted to receive the sides of the end portions 65 of the arms 63. The yokes are connected by a spring 69, whereby movement of one of them beyond the center will cause the other to be snapped to the opposite side.

Suitable means are provided for moving the upper yoke when the pistons approach the end of a stroke. As shown, a tubular guide 70 is arranged on the cylinder, and this guide is adapted to receive an arm 71. One end of the arm is offset, as at 72, and the arm is provided with a projecting portion 73 arranged adjacent the other end. The other end of the arm is provided with an off-set 74, arranged at an angle to the projections 72 and 73 and adapted to be received in the upper yoke of the valve actuating mechanism. The arms 72 and 73 are arranged in the path of the connecting member 17 and are adapted to be engaged by the sides of the depending portions of this connecting member.

In operation, the pistons 7 are reciprocated in the cylinder by differential pressure existing in opposite ends of the cylinder. The pipe 28 is connected to a source of pressure or suction and is provided with a valve (not shown) whereby the casing 3 may be connected to the source of power at will. With the valves in the position shown in Figure 3 of the drawings, the pistons are moving toward the right end of the cylinder. This end of the cylinder is in communication with the pipe 28 through the passages 27, 30, 43, groove 47, passages 48, chamber 46, passage 50 and pipe 51. The valve face 55 is disconnected from the seat 49 and valve face 56 is in engagement with the seat 54, thus cutting off communication between this end of the cylinder and the atmosphere. The opposite end of the cylinder is in communication with the atmosphere through the passages 37 and 38, the valve 42 thus being disengaged from the valve seat 39. Communication between the left end of the cylinder and the source of suction is interrupted by the engagement of the valve face 41 and the valve seat 36 formed on the inner end of plug 32. As the piston approaches the end of its stroke, the right side of the depending portion 20 of the connecting member engages the arm 72 and moves it in the guide 70. This movement is limited by the engagement of the arm 73 with the opposite end of the guide. The movement of the member 71 swings the upper yoke 66 on its pivot, the yoke being connected to the arm 74. When the piston approaches the right end of the cylinder, the yoke is swung outwardly away from the supporting plate 62. As the upper end of the spring 69 passes the center line or pivot point of the lower yoke 58, the tension of the spring snaps this yoke over to its other position and moves the valves to the right in Figure 3, through the connecting member 57. The valve face 55 then engages the seat 49 and the face 56 is disengaged from the seat 53. This opens the right end of the cylinder to the atmosphere through the passages 50 and 52 and disconnects this end of the cylinder from the source of power. The valve 40 is likewise moved to the right, seating the valve face 42 on the seat 39 and disconnecting the left end of the cylinder from the atmosphere. The engagement of valve face 42 and the valve seat 39 disconnects the left end of the cylinder from the atmosphere. The disengagement of valve face 41 and the valve seat 36 connects the left end of the cylinder to the source of power through the passage 27, groove 34, ports 35, chamber 33, and passage 37. The piston then moves in the opposite direction until the end of the stroke is approached when the connecting member engages the arm 73 and moves the valves to their original positions. It will be apparent that the provision of spring control means for moving the lower yoke, to which the valves are connected, prevents the valves from being stopped in a half-way position with both valves partly open. The movement of the yokes is limited by the engagement of the arms 72 and 73 with the ends of the guide member 70.

The reciprocation of the piston in the cylinder reciprocates the cleaner element 24 over the front of the windshield so that the rubber strip 25 engages the surface of the windshield to remove foreign matter. The connecting member 20 is relatively thin and is able to move in the slot 12 by slightly displacing the flexible strip 15. The power of the motor is sufficient to force this strip outwardly and the connecting member moves to the right or left and the displaced portion of the flexible strip immediately assumes its former position when a connecting member has passed, due to the tension of spring 16. By providing such construction, it is possible to increase the length of the stroke of the motor in proportion to the length of the cylinder and clean practically the entire surface of the windshield. From an inspection of Figure 6 of the drawings, it will be seen that the surface 13 forms a bearing for the connecting member and further forms a relatively broad engaging surface for the flexible strip 15, thus reducing the possibility of leakage.

It is to be understood that the form of our invention herewith shown and described is to be taken as a preferred example of the same and that various changes in the shape, size, and arrangement of parts may be resorted to without departing from the spirit of the invention or the scope of the subjoined claims.

We claim:

1. In a suction operated motor for windshield cleaners, a casing, a piston member arranged in said casing, said casing being provided with a slot, wiper actuating member extending through said slot and connected to said piston member, and means for normally closing said slot.

2. In a suction operated motor for windshield cleaners, a casing, a piston member arranged in said casing, said casing being provided with a slot, wiper actuating member extending through said slot and connected to said piston member, a flexible member normally closing said slot, said flexible member being adapted to be moved by said wiper actuating member, and means for normally retaining said flexible member in closed position.

3. In a suction operated motor for windshield cleaners, a casing, a piston member arranged in said casing, said casing being provided with a slot, wiper actuating member extending through said slot and connected to said piston member, and a yielding member closing said slot, said yielding member being adapted to be moved away from said slot by said wiper actuating member as it travels in said slot.

4. In a suction operated motor for windshield cleaners, a casing, a piston member arranged in said casing, said casing being provided with a slot, wiper actuating member extending through said slot and connected to said piston member, a yielding member arranged over said slot, and a spring to normally retain said yielding member against said cylinder, said yielding member being adapted to be moved away from said cylinder by wiper actuating member traveling in said slot.

5. In a suction operated motor for windshield cleaners, a cylinder having a longitudinal slot formed therein, a piston mounted in said cylinder, a member connected to said piston and extending through said slot, and a yielding member normally closing said slot, said yielding member being adapted to be moved away from said slot by said first mentioned member as it travels in said slot.

6. In a suction operated motor for windshield cleaners, a cylinder having a longitudinal slot formed therein, a piston mounted in said cylinder, a connecting member secured to said piston and projecting through said slot, a cleaner arm connected to said member, a yielding member normally closing said slot, said yielding member being adapted to be moved away from said slot by said connecting member traveling therein, and a spring to return said yielding member to its normal position.

7. In a suction operated motor for windshield cleaners, a cylinder having a longitudinal slot formed therein, a pair of spaced pistons mounted in said cylinder, a web connecting said pistons, said web being provided with a substantially flat face, a connecting member secured to the flat face of said web, said connecting member being provided with a depending portion extending through said slot, and a yielding member normally closing said slot, said yielding member being adapted to be moved away from said slot by said connecting member traveling therein.

8. In a suction operated windshield cleaner, a cylinder having a longitudinal slot therein, a flexible closure for closing the cylinder slot whereby a vacuous condition may be created within the cylinder, a piston operable in the cylinder and carrying a wiper supporting part extending through the slot and progressively opening the closure at a point spaced from the vacuous zone in the cylinder as said part moves along the slot, said closure sealing the slot in the rear of the part as it advances, means tending to create a vacuous condition in the cylinder alternately on opposite sides of the piston, and a wiper carried by said part.

9. In a suction operated windshield cleaner, a cylinder having a longitudinal slot, one wall of which extends tangentially, a closure flap secured to the opposite wall of the cylinder slot for seating on said first wall to close the slot to the admission of atmospheric pressure, a piston operable in the cylinder, and a wiper carrying member on the piston having a thin portion extending through the slot beneath the closure flap and in flat contact with the tangential wall for movement thereover by the piston, said thin portion lifting the closure flap only slightly from its seat as it passes therebeneath.

10. In a suction operated windshield wiper, a cylinder, a piston reciprocable therein, said cylinder having a longitudinal slot in its wall, a wiper carrying member operable by the piston and projecting through the cylinder slot for operating a wiper, means for alternately connecting the opposite ends of the cylinder to a source of suction to effect operation of the piston, and means for closing the cylinder slot on the suction side of the piston.

11. In a suction operated windshield cleaner, a cylinder having a longitudinal slot in its wall, a piston operable in the cylinder, a wiper carrying member operable by the piston and projecting through the slot to the exterior of the cylinder for operating a wiper over a windshield glass, valve mechanism for placing the opposite ends of the cylinder alternately in communication with a source of pressure for moving the piston back and forth in the cylinder, and means for normally closing the cylinder slot against the admission of atmospheric pressure therethrough and permitting the movement of said wiper carrying member in the slot.

12. In a suction operated windshield cleaner, a cylinder having a longitudinal slot therein, a piston operable in the cylinder and having spaced packing elements, means for connecting the opposite ends of the cylinder alternately to a source of suction for operating the piston, a wiper carrying member connected to the piston and extending through the slot at a point intermediate of the spaced packing elements, and a flexible valve for closing the cylinder slot to the admission of atmospheric pressure and permitting the wiper carrying member to move along the slot, said wiper carrying member opening the valve where it passes through the slot and at a point spaced from the zone of suction within the cylinder.

13. In a windshield cleaner, a cylinder, a piston reciprocable therein, means for alternately placing the opposite ends of the cylinder in communication with a source of suction for effecting reciprocation of the piston, said cylinder having a longitudinal slot which extends into the suction zone of the cylinder, a wiper actuating part operable by the piston and extending from within through the slot for moving a wiper across the glass of a windshield, and means carried by one of the first two named members for closing the slot over the suction zone of the cylinder.

In testimony whereof, we affix our signatures.

FREDERICK G. FOLBERTH.
WILLIAM M. FOLBERTH.